US006791467B1

(12) United States Patent
Ben-Ze'ev

(10) Patent No.: US 6,791,467 B1
(45) Date of Patent: Sep. 14, 2004

(54) ADAPTIVE REMOTE CONTROLLER

(75) Inventor: Yuval Ben-Ze'ev, Tel Aviv (IL)

(73) Assignee: Flextronics Semiconductor, Inc., Sunnyvale, CA (US)

( * ) Notice: Subject to any disclaimer, the term of this patent is extended or adjusted under 35 U.S.C. 154(b) by 0 days.

(21) Appl. No.: 09/533,250

(22) Filed: Mar. 23, 2000

(51) Int. Cl.[7] .............................................. G08C 19/00
(52) U.S. Cl. ........................ 340/825.69; 340/825.72; 340/825.22; 340/7.55; 340/7.56; 348/734; 345/169; 345/173; 398/106; 398/107; 398/108
(58) Field of Search ...................... 340/825.69, 825.72, 340/825.22, 7.55, 7.56; 348/734; 345/169, 173; 359/142, 145, 146; 341/176; 700/83; 398/106, 107, 108

(56) References Cited

U.S. PATENT DOCUMENTS

| 4,746,919 | A | * | 5/1988 | Reitmeier | 340/825.56 |
| 4,769,643 | A | | 9/1988 | Sogame | 340/825.69 |
| 5,528,229 | A | * | 6/1996 | Mehta | 340/3.4 |
| 5,646,608 | A | * | 7/1997 | Shintani | 340/825.52 |
| 6,097,309 | A | * | 8/2000 | Hayes et al. | 340/825.69 |
| 6,127,941 | A | * | 10/2000 | Van Ryzin | 340/825.69 |
| 6,133,847 | A | * | 10/2000 | Yang | 340/825.22 |
| 6,204,796 | B1 | * | 3/2001 | Chan et al. | 341/176 |
| 6,377,861 | B1 | * | 4/2002 | York | 700/83 |

* cited by examiner

Primary Examiner—Michael Harabik
Assistant Examiner—Yves DaLencourt
(74) Attorney, Agent, or Firm—Mark M. Friedman

(57) ABSTRACT

A method and system for the remote controlling of appliances includes an adaptive remote controller that adapts itself automatically to its environment so as to remotely control a plurality of appliances. The adaptive remote controller is RF based and has the capability of two way communication with appliances. The adaptive remote controller provides information, alerts and help to a user.

44 Claims, 6 Drawing Sheets

ADAPTIVE REMOTE CONTROLLER

FIELD OF THE INVENTION

The field of the invention relates in general to means for remotely controlling appliances. More particularly, the invention relates to an adaptive universal remote controller, that can adapt itself to any new environment, for example, while its operator is moving from one environment into another, or while the environment itself is modified by the introduction of a new appliance in it. The invention further relates to an adaptive-interactive remote controller that can further interact with appliances, for providing the user of the remote controller help guidance, and/or options that are specific to an appliance, or to a situation.

BACKGROUND OF THE INVENTION

Remote controllers for electrical and electronic appliances are well known, and are widely used. In recent years, as home appliances have been improved to include more and more new features, more products for home use are being provided with remote controllers. Generally, although most of the newer remote controllers apply infrared rays for transmission, there is no one standard for remote controllers, and each company provides its appliances and remote controllers with its specific protocol of communication. In many cases, companies change the communication protocol even from one model to another in the same type of appliance.

This problem is well known, and the prior art has extensively tried to provide a so-called "universal" remote controller that is capable of controlling one or more different appliances, although the so-called universal remote controller has not been specifically designed for controlling them. Such a universal remote controller is generally provided with means for "learning" the control features of the device/s and the control signals for carrying them out, and with means for generating such signals, when desired.

There are known some types of universal remote controllers, these generally differing in their manner of programming. More particularly, the universal remote controllers of the prior art differ in the manner of teaching them the specific signals to be transmitted by each key, the location of the relevant keys for operating each appliance, and the keys' functionality.

One known type of a universal remote controller e.g., as disclosed in U.S. Pat. No. 4,769,643 is designed to learn the said relevant information from one or more original, dedicated remote controller/s that are provided by the manufacturer with each relevant appliance. This type of universal remote controller suffers from the drawback that the teaching procedure of the universal remote controller requires having the original remote controller of each appliance, which is not always available. Furthermore, the teaching procedure is tedious, as it requires the carrying out of the teaching procedure separately for each appliance, and for each specific key of the remote controller.

A second type of a universal remote controller e.g., as disclosed in EP 907,156 is provided with a special interface for downloading the relevant information into the remote controller from an external source. Such an information source may be, for example, the manufacturer's Internet site, a Smart Card, a plugged in ROM card, etc. A drawback of this type of universal remote controller is that the source of the relevant information is in many cases not readily available, particularly if the site (when this is the information source) is not updated for all the manufacturers' models. Moreover, there is the need for a special plugged-in card that has to be programmed, or for a special interface. A second drawback of this type of remote controller is that the procedure of programming (or downloading) in any case requires special skills by the one who carries out the programming procedure.

There are some other variations to the above types of universal remote controllers. However, they all suffer from similar drawbacks.

Moreover, the existing universal remote controllers are designed for handling some "standard" appliances, such as a TV, a stereo receiver, a video recorder, a tape recorder, a CD player, etc. Their keyboards are generally not provided with keys for handling newly available features in new models of the above "standard" appliances, and definitely not with keys for handling new appliances that are being provided with remote controllers for the first time. Moreover, there are some remote controlled outdoor appliances, such as a garage door, or a car alarm system that are provided with remote controllers using encrypted signals. The existing universal remote controllers are not capable of learning from the dedicated remote controllers with encrypted signals of such appliances.

Furthermore, the remote controllers of the prior art are generally uni-directional, capable only of sending signals to the appliances, in order to carry out some of their specific operations. They are not capable of receiving information from the appliances, and do not comprise a graphic man-machine interface (MMI) for easing and extending their operations, and for providing more friendly operation. Moreover, most of the existing remote controllers are based on infrared signal transmission, that generally requires a line of sight between the remote controller and the appliance. The remote controller of the invention also overcomes this drawback, as it is RF based, and is provided with a non-directional antenna.

It is therefore one object of the invention to overcome the above-mentioned drawbacks of the existing universal remote controllers.

It is another object of the invention to provide a remote controller that can handle any remote controlled appliance, of any type, model, and with any type of feature, even a new one.

It is still another object of the invention to provide the said remote controller with the ability to easily handle a plurality of remote controlled appliances.

It is still another object of the invention to provide the said remote controller with the capability of adapting itself immediately and automatically to any remote controlled appliance with any features whatsoever, and in any environment, with no need for any programming procedure to be carried out by the operator.

It is still another object of the invention to provide the said remote controller with the capability of adapting itself immediately to handle the addition of a new appliance in its existing environment.

It is still another object of the invention to provide the said remote controller with the capability to adapt itself immediately and automatically to any movement of the operator with the remote controller into a new environment that includes appliances different from the previous environment. Such a new environment can be, for example, another apartment, a new room in the same apartment, another floor in the same apartment, or an outdoor environment such as a parking lot paying-entering device, a control device for automatic payment machine in toll way, a control of an ATM machine for withdrawal of cash, an industrial environment such as an automatic warehouse, or a manufacturing plant where machines can be "wirelessly controlled", etc.

It is still another object of the invention to provide to said adaptive remote controller the capability to adapt itself immediately to handle any new feature of any new or existing appliance, by displaying on the display a descriptive symbol or text that is directly connected to a relevant key for activating the new feature.

It is still another object of the invention to provide the said remote controller with the capability of adapting its operations based on the current or past status of appliances with whom contact has been made.

It is still another object of the invention to provide said remote controller with a new type of display that clearer for viewing and determining the function of each key.

It is still another object of the invention to provide an adaptive remote controller that is much more user-friendly, particularly due to its new manner of teaching and operating. For example, a remote controller that is with a graphic Man-Machine Interface (MMI).

It is still another object of the invention to provide such advantages that will encourage manufacturers to produce more and more appliances with the capability of being remote controlled. Such appliances may be, for example, an electric kettle, a light bulb socket, a washing machine, etc., for which providing a dedicated remote controller was not economic.

It is still another object of the invention to notify the user of the remote controller about all the appliances in its close environment that can be remote controlled.

It is a further object of the invention to provide the remote controller of the invention with sound operating, informing, and guiding capabilities, suitable particularly for the visually impaired.

It is still a further object of the invention to provide with the remote controller of the invention the capability of providing a HELP and assisting guidance, specific for the operation of each appliance.

It is still another object of the invention to provide a remote controller that can run a full application that is received from an appliance, the application may include an interactive capabilities for handling different situations.

It is still another object of the invention to provide a system comprising a plurality of appliances in an environment, and an adaptive remote controller for operating said appliances.

It is still another object of the invention to provide scripts to manage the appliances in an environment. For example, the remote controller user may define a script that turns lights on and off, turns on the heating system or starts the action of a washing machine according to specific event or time stamps.

Other objects and advantages of the invention will become clear as the description proceeds.

SUMMARY OF THE INVENTION

The invention relates to a method for remote controlling of appliances by a remote controller the method comprising:

I. In each appliance:
  a. providing a receiver for receiving signals from the remote controller;
  b. providing a transmitter for transmitting signals to the remote controller;
  c. providing a memory containing a set-up file, said set-up file including a functional section containing information for a remote controller regarding the various signal formats that should be sent by the remote controller in order to activate corresponding various features of the appliance and information for assigning each of said features to a button of the remote controller, and optionally an identification section containing data regarding the model identification of the appliance;
  d. providing decoding means for decoding signals sent by the remote controller, and accordingly either: (a) activating a feature of the appliance; or (b) transmitting at least a portion of said set-up file to the remote controller.

II. In the remote controller:
  a. providing a plurality of buttons;
  b. providing a receiver for receiving signals sent from at least one appliance;
  c. providing a transmitter for transmitting signals to at least one appliance, each of said signals being either: (a) a signal for activating a feature of the appliance; or (b) a signal instructing the appliance to transmit at least a portion of its said set-up file;
  d. providing a memory storage for storing a portion or entirety of at least one set-up file;
  e. when the signal received from an appliance is a set-up file or a portion thereof, storing the same in said memory storage of the remote controller;
  f. providing means in the remote controller for selecting a set-up file or a portion thereof to be an active one; and
  g. using the content of said active set-up file for associating each feature of the corresponding appliance with a button in the remote controller for activating that feature.

Preferably, the appliances are home appliances or outdoor appliances. The range of communication between each appliance and the remote controller is generally up to about 100 meters. The communication between the appliances and the remote controller of the invention and vice versa is multidirectional, and is carried out in the RF range.

Preferably, the remote controller of the invention further comprises a display screen. The display screen is preferably a touch screen on which virtual buttons are displayed, and said buttons are activated by means of pressing their location on the screen. Preferably on the screen of the remote controller displays the virtual buttons for operating those appliances for which set-up files are active.

Preferably, each appliance transmits the identification section of its set-up file periodically, and the functional portion of its set-up file upon receipt of an acquiring command from a remote controller. Alternatively, the identification portion of each setup file is sent periodically by the appliance to the remote controller.

Preferably, the remote controller displays on its screen an identification symbol for any appliance for which it contains in its memory storage an identification portion of the appliance set-up file. The remote controller marks on its screen as "existing and available" any identification symbol of an appliance for which it contains in its memory storage a functional portion of the appliance set-up file. The said identification symbol is an icon or a text representing a corresponding appliance. The acquiring command for acquiring a functional portion of an appliance set-up file is transmitted from the remote controller to a specific appliance upon pressing the appliance symbol on the screen of the remote controller.

Preferably, the set-up file of the appliance further comprises a status portion, indicating the current status of the appliance.

Preferably, the functional section of the set-up file of the appliance further comprises data regarding the graphic image of the remote controller of the appliance, and of each of its buttons.

Preferably, the set up file further includes a HELP section, for providing the user of the remote controller with help regarding on how to control and operate the appliance. The invention further relates to a remote controller for controlling at least one appliance in an environment, characterized in that it acquires from each appliance in the said environment a set-up file containing a functional portion of at least information regarding the various signal formats that should be sent by the remote controller for activating various features of the appliance and information for assigning each of said features to a button of the remote controller, and optionally, an identification information regarding the identification of the said appliance.

Preferably, the remote controller comprises:
a. a plurality of buttons;
b. a receiver for receiving signals from at least one appliance;
c. a transmitter for transmitting signals to at least one appliance, each said signal being either: (a) a signal for activating a feature of the appliance; or (b) an acquiring command instructing the appliance to transmit at least a portion of its set-up file;
d. a memory storage for storing at least one set-up file that is received from an appliance;
e. means for selecting a set-up file to be defined as an active one; and
f. means for associating each feature of the appliance with a button of the remote controller for activating that feature.

Preferably, the remote controller of the invention is further provided with means for displaying on the display screen identifications of all appliances of which an identification portion is received by the remote controller. The remote controller of the invention preferably further comprises means for sending an acquiring command to a specific appliance, for acquiring from the appliance the functional portion of its set-up file, and for storing said functional portion in the remote controller memory.

Preferably, the remote controller is further provided with means for acquiring a status section of a set-up file from the appliance. Such means includes, for example, a status acquiring command that is sent from the remote controller to the appliance, asking it to transmit its status portion. After receipt of the status section of the set-up file of the appliance, the remote controller can display the current status of the appliance who sent the status section.

The remote controller is preferably also provided with means for determining from a received status section of a set-up file of an appliance a current status of that appliance. Preferably, the remote controller is further provided with indicating and alerting means, for informing the user of the remote controller according to the determining of a received status section. The remote controller preferably further includes safety means and security means such as user authentication means.

The remote controller of the invention preferably marks the identification symbols of all appliances in the environment for which their functional portion of their set-up file is stored in the memory storage of the remote controller as "existing and available", the remaining identification symbols of the rest of the appliances, for which a functional portion has not been acquired by the remote controller remain marked as "existing but not available". Preferably, remote controller further includes means for deleting from the memory storage of the remote controller a setup file of an appliance or its identification portion, if the identification portion of the set-up file is not received during a predetermined time period.

The invention also relates to a system for remote controlling of appliances in an environment, said environment including at least one appliance and at least one remote controller, each appliance in said environment having its specific features and its predefined signals for remotely activating said features, the system comprising, I. at least one appliance, comprising:
a. a set-up file containing a functional portion of information on how to remotely activate features of said appliance, and optionally, an identification portion identifying the appliance;
b. a receiver for receiving commands from a remote controller;
c. a transmitter for transmitting information from the appliance to the remote controller; and
d. a logic circuit for decoding commands from a remote controller and:
d.1 when a command is found as an activating command, activating a corresponding feature of the appliance; and
d.2 when a command is decoded as an acquiring command, transmitting at least a portion of said set-up file to the remote controller who sent the acquiring command;

II. at least one remote controller for controlling at least one appliance in an environment, characterized in that it acquires from each appliance in the environment a set-up file containing a functional portion of at least information regarding the various signal formats that should be sent by the remote controller for activating various features of the appliance and information for assigning each of the features to a button of the remote controller, and optionally an identification information regarding the identification of the said appliance;

and III. a wireless communication protocol in each appliance and remote controller for managing communication in the environment between the at least one remote controller and the at least one appliance in said environment.

The communication protocol between each appliance and the remote controller and vice versa is a wireless communication protocol for appliances, such as Home-RF (HomePNA)", "Wireless LAN", "Bluetooth", or similar.

DETAILED DESCRIPTION OF PREFERRED EMBODIMENTS

Figure 1:
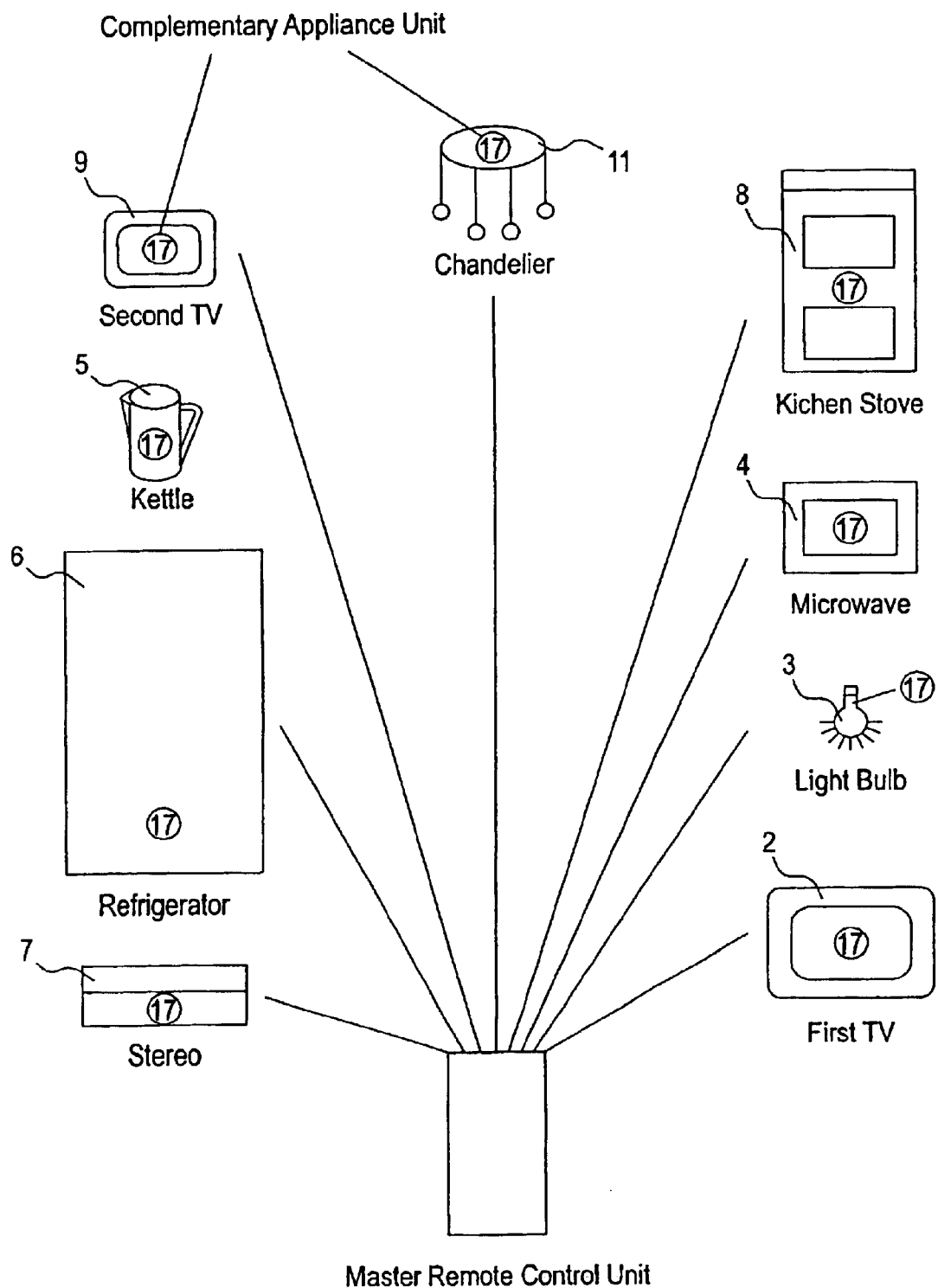
FIG. 1 shows a system including the remote controller, according to one embodiment of the invention.

A remote control system according to one embodiment of the invention is shown in FIG. 1. The adaptive remote controller 1 is provided with means for bi-directionally communicating with a plurality of electrical or electronic appliances in its vicinity. For example, a typical home may comprise the following remote controlled appliances: a main TV 2, a first light bulb 3 in the bedroom, an oven 4, a kettle 5, a refrigerator 6, a stereo system 7, a living room chandelier 11, a second TV set 9, etc.

As mentioned hereinabove, according to the prior art each of said appliances is provided with its dedicated remote controller, for activating any available feature in that specific appliance. The most common remote controllers of the prior art are provided with an infrared transmitter for sending remote controlling signals to the appliance. The so-called universal remote controllers of the prior art are provided with a RAM or ROM, or EPROM, or EEPROM internal database, to which set-up information regarding the key-map and signal format of at least one apparatus to be controlled is entered. Such information can be commonly provided to the internal database from various sources, such as from a smart card, from an Internet database, from a plugged-in card, etc. According to another existing method, the remote controller is provided with said information by carrying out a "learning" procedure, by which it learns the set-up information from each appliance dedicated, manufacturer-provided remote controller. Furthermore, the infrared communication between prior art remote controllers and the appliances is relatively directional, and a line of sight between them is generally required. Moreover, the remote controllers of the prior art are capable of only transmitting to the appliances, not of receiving information from the appliances.

Figure 2:
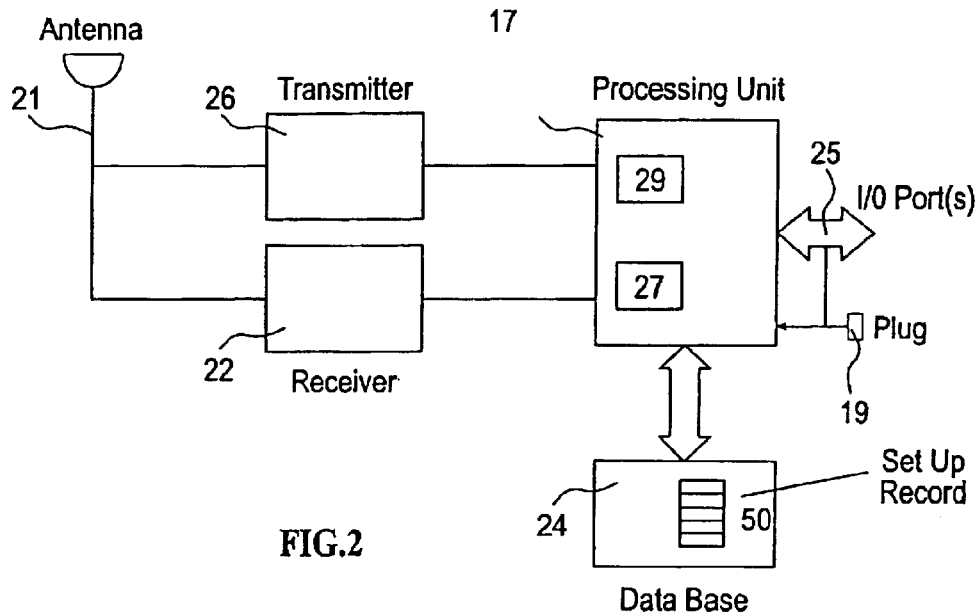
FIG. 2 shows the structure of a part that is added to each appliance to be controlled, according to one embodiment of the invention.

FIG. 2 shows the structure of an additional part that is added to each appliance, according to one embodiment of the invention. Each appliance in the system 20 (of FIG. 1) (i.e., each controllable appliance) is provided with a non-directional antenna 21, a receiver 22, a transmitter 26, a small database 24, and a processing unit 23. The processing unit preferably also includes a memory unit that stores, for example, the program required for the operation of the processing unit, and some I/O ports 25 for delivering updating information between the appliance and the processing unit. For example, via one I/O port, updating information regarding the current status of the appliance may be transferred from the appliance to database 24. Alternatively, another I/O port 25 may be used for externally loading, when desired, updated set-up information to database 24, e.g., from a PC computer (not shown) via plug 19. Such updated information may be, for example, new control signal formats, or a new graphic of the remote controller of the appliance, or a reloading of the set-up file, due to any malfunction.

The small database 24 in the appliance contains set-up data (hereinafter, "the set-up data") that can be transmitted by transmitter 26 to the remote controller providing it all the information it needs in order to control the appliance. For example, such information may include at least the format of all various signals that have to be sent by the remote controller to the appliance in order to activate different features of that appliance, and information connecting each of these signals to a corresponding key of remote controller. Optionally, in a most preferred embodiment of the invention, and as will be elaborated later, the set-up data may further include a full graphic and text description of each key, a HELP assisting portion, a status information about the appliance, a specific application to be run at the remote controller, etc.

Figure 3:
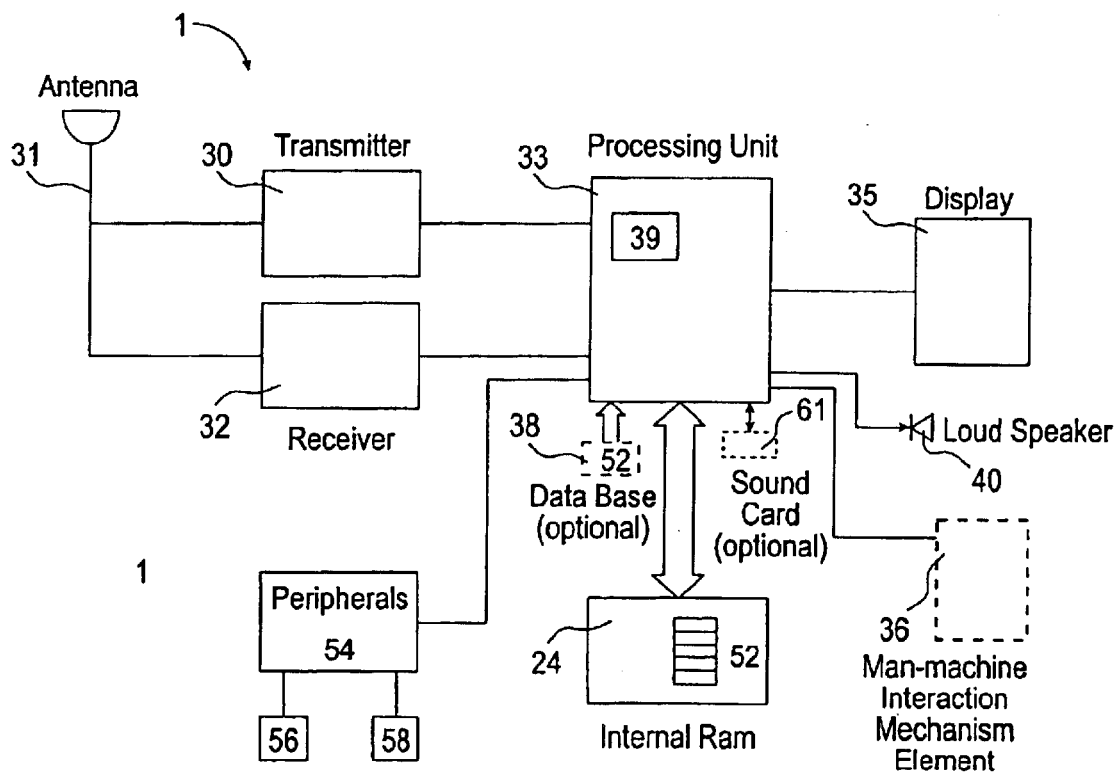
FIG. 3 shows the basic structure of the remote controller, according to one embodiment of the invention.

FIG. 3 shows a basic structure of an adaptive remote controller 1, according to one embodiment of the invention. The adaptive remote controller 1 comprises a non-directional antenna 31, a receiver 32, a transmitter 30, an internal RAM 34 for storing set-up data of a plurality of appliances, and a display 35. The display 35 is preferably an interactive-type display, which can display virtual keys that can be activated by pressing on their display location. Such a display is commonly known, and is used, e.g., in PDAs (Personal Digital Assistance) such as the 3Com's PalmPilot™ product. Alternatively, the display may be a conventional display that is not touch-sensitive, and in that case, a set of keys 36 is also included in the remote controller. The remote controller may optionally also include a ROM/PROM/EEPROM database 38, containing set-up information for a plurality of the most commonly used appliance's models, and/or an interface for enabling adding set-up information of prior art appliances. The remote controller also comprises a processing unit 33 and conventional peripherals (memory bank, I/O ports, etc.), for carrying out its operation. The memory bank, of course, stores the basic application that operates the remote controller. The remote controller is preferably also provided with a loudspeaker 40 for sounding a warning and/or any sound message. When audio messages are desired, a sound card 61 (with a synthesizer) is also provided in the remote controller of the invention.

The processing unit 23 and 33 of each appliance and/or a remote controller according to the invention may be of any kind known in the art, such as a micro-controller, a microprocessor, etc.

Lately, new Radio Frequency (RF) communication protocols in the unlicensed Industrial Scientific Medical, hereinafter ISM (2.4 GHz) band are emerging, enabling appliances to communicate by means of wireless propagated radio signals instead of by means of a directional infrared-based communication, as is the case between remote controllers and appliances of the prior art. The new communication protocol for appliances includes the "Home-RF (HomePNA "Wireless LAN", and "Bluetooth". The system 20 of the application preferably operates in one of said protocols, however any other suitable communication protocol or frequency range may be used instead. The transmitters and receivers of the remote controller, as well as of each one of the appliances, are intentionally designed to enable communication over a short range, generally of no more than about 100 meters, in order to limit the communication to a close range, thereby not interfering with other environment/s operating in the same ISM band. In some cases, the operator of the remote controller may even be provided with means for adjusting the sensitivity of the remote controller, for example, to abut the range boundaries of an apartment, when such a range limitation is desired. In other cases, control points can be added to increase the range.

According to the present invention, each appliance is provided with a unique device code. All appliances in one location are preferably grouped to one local network, which receives a network-unique code, so that the remote controller can identify each appliance and local network. Each appliance in the system, as well as the remote controller, is provided with a wireless communication protocol (including its related software) such as Bluetooth, Home-RF (HomePNA), Wireless LAN, etc., that manages the communication between all components in the network, including at least the appliances, and the one or more remote controllers in its vicinity. The communication protocol further serves the conventional purposes of assigning priority, granting transmitting approval, solving collisions, allocating temporary IP addresses, etc.

As said, a copy of the set-up file of each appliance in the vicinity of the remote controller is sent, when necessary, to the remote controller, which in turn can store a plurality of set-up files or portions thereof of essentially all the appliances in its vicinity. Therefore, when the remote controller receives or has in its storage the set-up file of an appliance, it can control all features of it.

Figure 4:
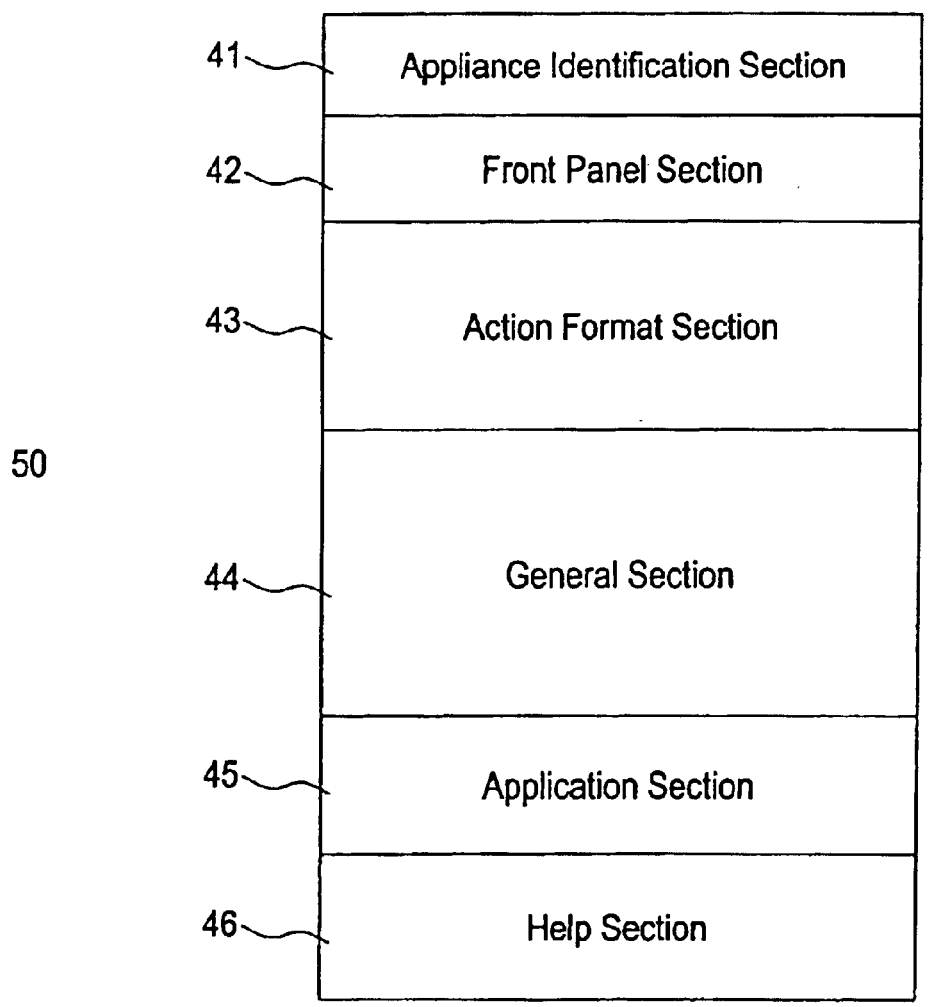
FIG. 4 shows the structure of the set-up file in the appliance.
Figure 7:
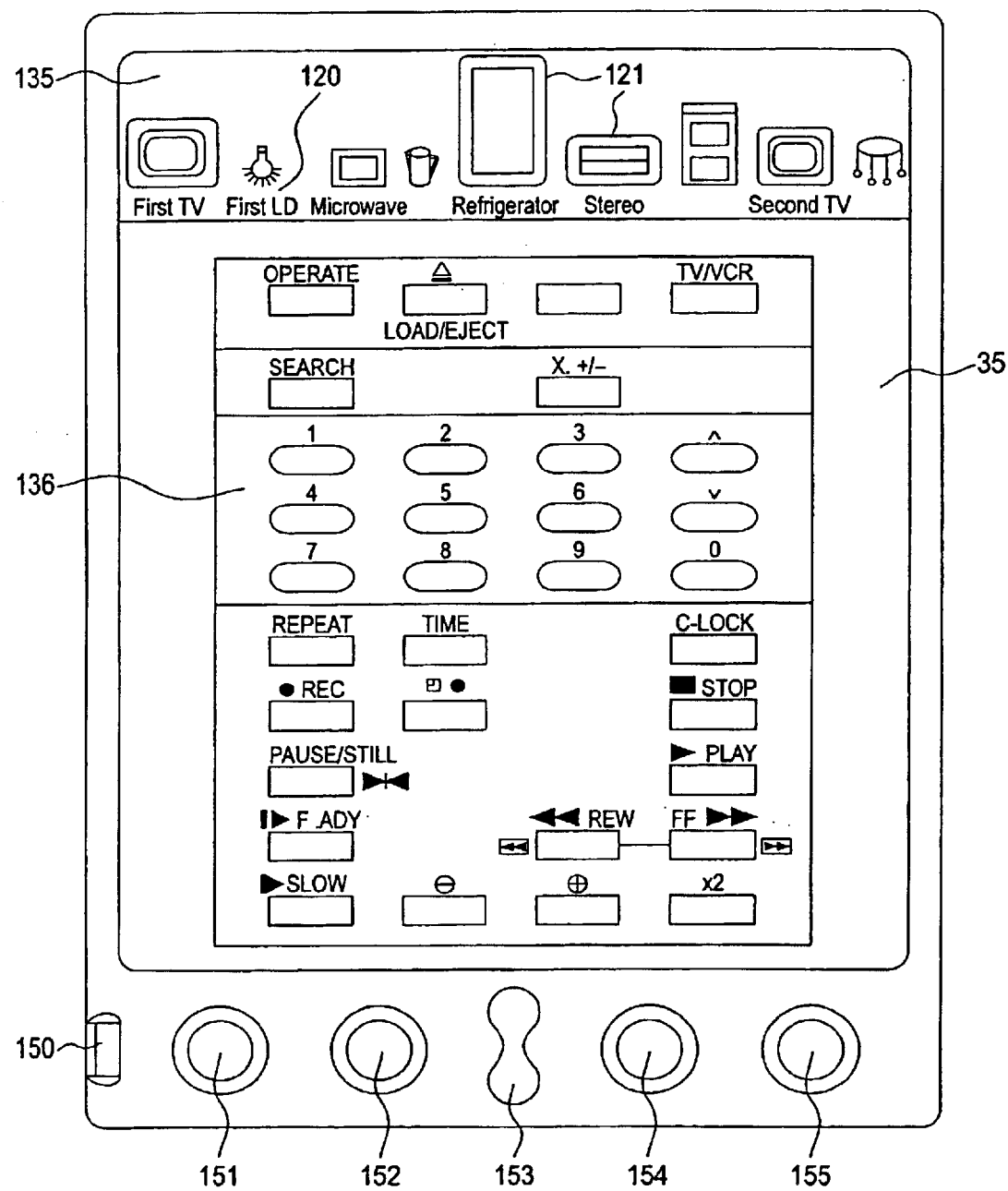
FIG. 7 shows the display of the remote controller operating as a TV remote controller.

FIG. 4 shows an exemplary set-up file that is stored in an appliance, and is sent, when necessary, to the remote controller. The set-up file 39 preferably comprises the following items:

a. A device identification section 41 containing, in text and/or in an icon, the description of that appliance; such a text description may be "Sony 43' TV", "Refrigerator", "Toshiba CD Player", etc. The optional icon is an icon best representing the appliance. Generally, said section also includes the appliance device code, or any other sign unique to that appliance.

b. A front panel section 42 containing a picture showing the front panel of a virtual remote controller of that appliance. More particularly, in the case of a TV remote controller, the picture may show an image of the keyboard of the original dedicated remote controller of that appliance, as provided by the manufacturer, or a similar picture. The picture, when displayed on the screen of the remote controller, shows a plurality of virtual buttons, and/or optionally, a text assigned to each of them. The picture information can be saved in a drawing format, or in a descriptive language format enabling the remote controller, based on this information, to draw this picture. An image 36 of a virtual remote controller of a video tape recorder is shown in FIG. 7.

c. A signal format section 43 that contains, for each virtual button, the format of a signal associated with it. Said signal format enables, for each button, the constructing of a signal, that when sent to the appliance will activate a corresponding feature of that appliance.

d. A general section 44, including any additional information specific to that appliance that may be needed by the remote controller or its operator. For example, this file may include the date and time, as currently set in the appliance, a status register or file that shows the current status of that appliance, such as, in the case of a video tape, it may indicate "recording, 30 min. left", the programming times of the videotape, etc.

e. An application section 45 that may include one application or more that, when sent to the remote controller, provides the operator with means for interacting with an appliance. For example, the application section may include an application that, when run in the remote controller, introduces screens enabling the operator, for example, to update the time of an appliance, to program a video tape to record a program at a specific time and channel, etc. Many variations of applications may be possible, and some examples for such applications will be given as the description proceeds. Furthermore, the application file may cause the remote controller to activate some sounds. For example, if the water in a kettle has reached the boiling temperature (or any temperature that may be set by the user), the kettle may send or activate an application at the remote controller that first sounds an alarm (such as "beep-beep-beep"), and then confirms this fact on the screen, e.g., by a message: "The water is boiling". In another example, a video recorder may notify the user of the remote controller of any malfunctioning, such as "the recording head is dirty, please clean it". According to still another embodiment of the invention, the application file may further include a full sound-application for the visually impaired, that may audibly notify the user of the remote controller about the status of an appliance. In the previous case, for example, a message may be heard from the remote controller, advising that "The water is boiling". In this case, the message is a synthesized message created by the sound card 61 and provided to loudspeaker 40. Of course the sound card may also be used for any function of the remote controller.

f. A HELP section 46 providing the user of the remote controller with assistance in operating the appliance. The user may use this information when needed. This information is essential, as in many cases users are not familiar with many features of the, and they need to resort to the application guide of the appliance, which is not always available. In the case of the invention, the HELP file can be acquired by the remote controller directly from the appliance and can therefore provide interactive assistance to the user of the remote controller, when necessary. Moreover, the help file may provide to the user a menu of actions from which the user may select an action, that will be translated by the remote controller directly from the help menu into a signal that will be sent to the appliance for carrying out the corresponding application.

As said, the remote controller of the invention comprises essentially a processing unit, a graphic touch-sensitive screen, and of course a transmitter, receiver and antenna. The remote controller may be, for example, part of a PDA (Personal Digital Assistance) device, such as 3Com's PalmPilot™, or comprise some of the components of such a PDA product or a similar product.

According to one embodiment of the invention, the remote controller periodically interrogates the existence of all appliances in its vicinity. More particularly, the remote controller initiates a signal containing the remote controller device code, and an interrogation code asking the device to identify itself. Upon receipt and identification of the signal, the appliance sends to the remote controller an identification signal including the device code of the remote controller and the appliance identification section 41. The interrogation signal is generally sent periodically to all appliances, and the appliances respond with their identification, in the fashion dictated by the networking protocol in use. The communication protocol carry out the management of the transmission of the appliances, the priority, and the elimination of collisions, options that are generally a part of almost any wireless protocol, such as BlueTooth, Home-RF (HomePNA), Wireless LAN, etc.

Figure 6:
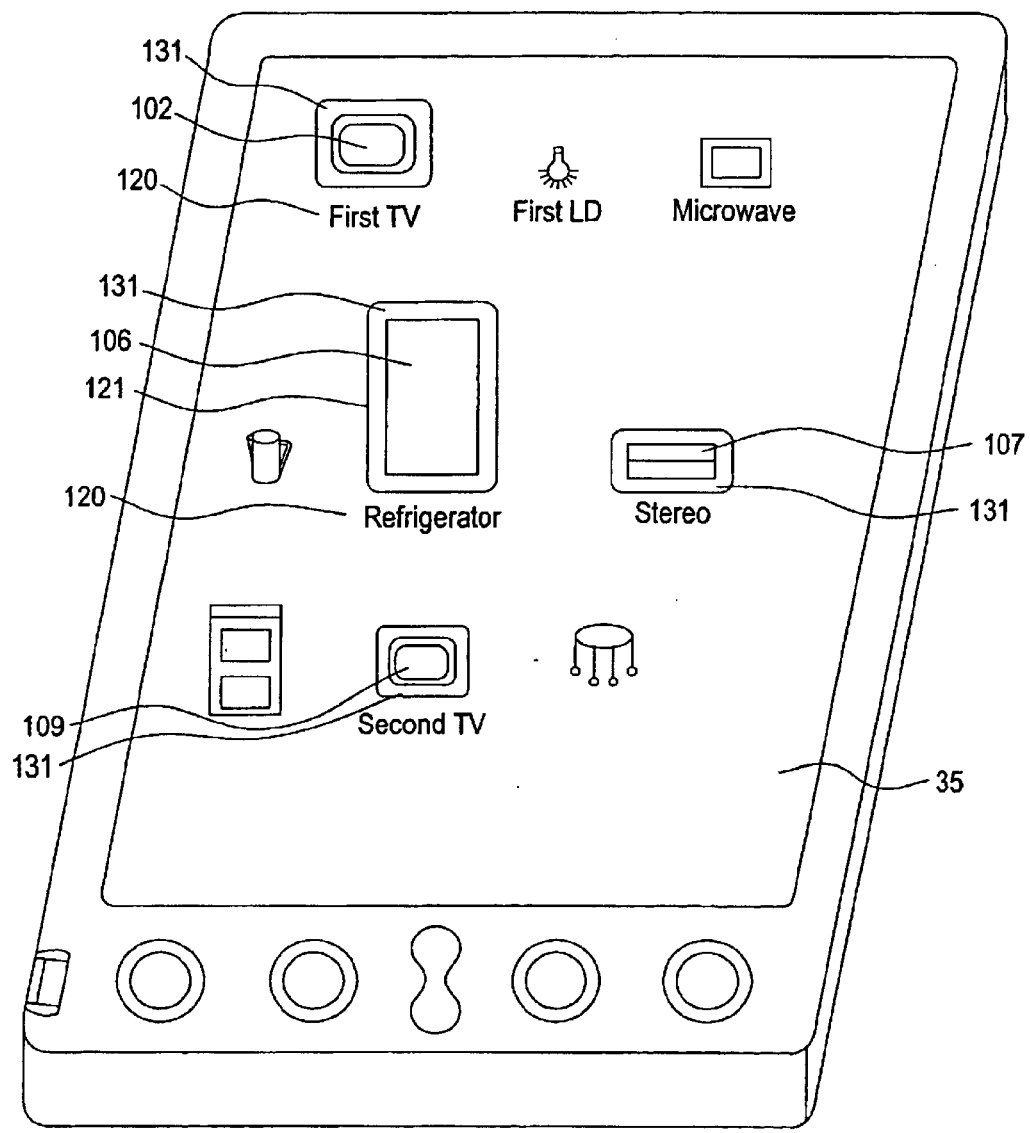
FIG. 6 shows a remote controller according to one embodiment of the invention, with a display screen showing the existence of several appliances in the vicinity of the remote controller.

FIG. 6 shows the remote controller 1, according to one embodiment of the invention. The remote controller, upon receipt of an identification signal from an appliance, displays the description of that appliance on its screen. As said, the description may include a text 120 describing the appliance, an icon 121, or both. If an identification signal from a device is not received within a predetermined period, for example, 5 minutes, the icon or text of that appliance is removed from the screen. In this fashion, the list of appliances in the vicinity of the user is continuously updated, even when the user moves from one location to another. Preferably, the user is also able to modify the general text 120 that is received from the appliance and associated with the icon. For example, the user may be able to modify a text "Sony TV" to a more descriptive text, for example, "Living Room TV".

According to another embodiment of the invention, each appliance in the vicinity of the remote controller sends, asynchronously, but coordinated by the communication protocol used, its identification signal. The identification signal includes, as before, the identification section 41 of the appliance.

After a few seconds, upon receipt of the identification signals from all appliances in its vicinity, the remote controller displays on its screen the icons 121, and/or text descriptions 120 of all appliances in its vicinity. The said information is included in the section 41 of each set-up file of each appliance that is sent to the remote controller. At that stage, the user who holds the remote controller can decide which of the appliances appearing on its screen he desires to control. Assuming, for example, that icons of all the appliances of FIG. 1 appear on the screen 130 of the remote controller, and the user plans to control the main TV 2, the refrigerator 6, the stereo 7, and the second TV 9, he should serially press on the icons of these appliances, 102, 106, 107, and 109, respectively. The remote controller in turn sends a request command to these appliances to send the remainder of their set-up files (hereinafter also referred to as "the functional portion of the set up file"), i.e., the front panel section 42, the signal format section 43, the general section 44, and optionally the application section 45, and/or the HELP section 46 to the remote controller. Of course, in some cases, only some of the above remaining sections may be transferred to the remote controller. The said remaining sections of the set-up files from each one of the above appliances are then stored in different portions of the database 34 of the remote controller 1. Furthermore, a special indication is given on the screen for each icon representing an appliance that has sent its remaining set-up file (hereinafter said appliances will be referred to as "controllable appliances"). In the above example, the fact that the remote controller 1 contains in its database 34 the remaining sections 42, 43, 44, and optionally 45 and 46 of the corresponding set-up files of the main TV 2, the refrigerator 6, the stereo 7, and the second TV 9, may be indicated on the remote controller screen by changing the background color 131 of their icons from gray to red. Therefore, the user can identify on the screen of the remote controller 1 icons of appliances that have been detected but cannot yet be controlled (having a gray background), and icons of appliances that can be controlled, as the corresponding remaining sections 42, 43, 44, and optionally 45, and 46 of their set-up files have been already transferred and stored in database 34 of the remote controller 1. Of course, the color indication is only an example, and any other convenient indication may be given.

Figure 5:
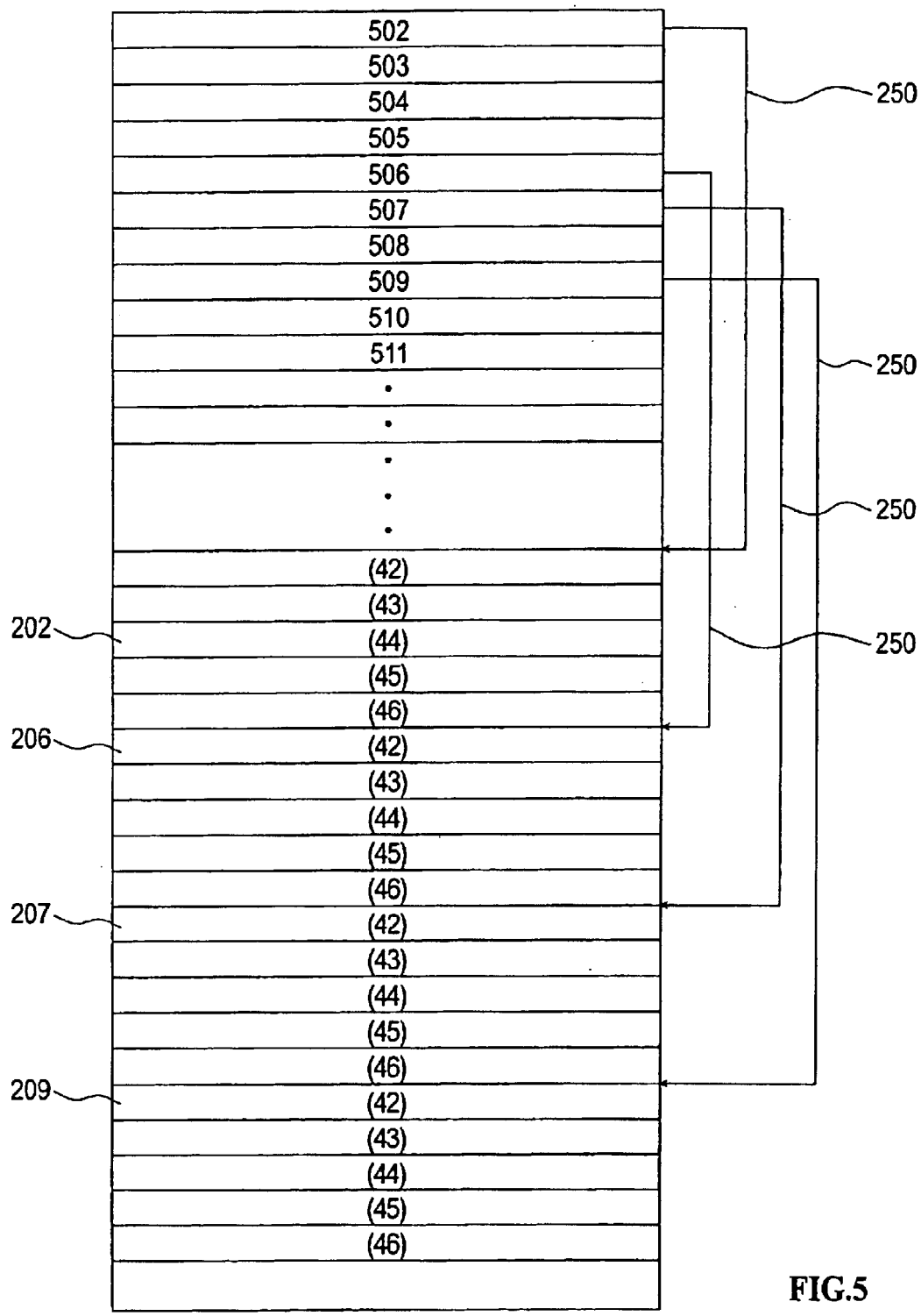
FIG. 5 shows the structure of the memory database at the remote controller that contains a plurality of set-up files.

A map of the database 34 of the remote controller 1 in the above example is shown in FIG. 5. The remote controller creates in database 34 small memory sections 502, 503, 504, 505, 506, 507, 508, 509, 510, and 511, storing the icons and/or text (section 41) of the corresponding appliances 2, 3, 4, 5, 6, 7, 8, 9, 10, and 11 that it detects in its vicinity. After requesting and acquiring the remaining portions 42, 43, and optionally 44, 45 and 46 of specific appliances, e.g., appliances 2, 6, 7, and 9, the remote controller stores correspondingly said remaining portions 42, 43, and optionally 44, 45 and 46 of each of said appliances in larger memory sections 202, 206, 207, and 209. The portions in parentheses (42), (43), (44) (45) and (46) indicate corresponding portions 42, 43, 44, 45, and 46 that have been acquired from said specific appliances. Descriptors 250 are provided and stored in any convenient manner to connect for controllable appliances their larger memory portions 202, 206, 207, and 209 with their corresponding smaller memory portions (storing the appliances' descriptions) 502, 506, 507, and 509. Therefore, when the user of the remote controller 1 presses an icon on the screen of a controllable appliance, a reference is made using the suitable descriptor to its corresponding memory portion containing the remaining set-up file of the appliance. Of course, more appliances may be included in the database of the remote controller 1 than given in this example. Furthermore, the database may be structured differently than herein, as is clear to a skilled person.

For controlling any of the controllable appliances, the user has to simply select its icon from the icons on the display by pressing on its location on the screen, or in another possible implementation, by pressing a physical key near the said icon display. Then, a reference is made into the remaining set-up file of the appliance, using its corresponding descriptor 250. Then, the appliance set-up file is activated, showing on the touch-sensitive screen of the remote controller the dedicated keyboard of the appliance remote controller 136 (FIG. 7), while the keys shown are virtual keys. Of course, each key on the screen is associated with a specific signal format required to activate a corresponding feature of the appliance. The signal is transmitted to the corresponding appliance by the RF transmitter 30, associated with the network code (when a) and the device code of the appliance.

Furthermore, any time when a keyboard of a specific appliance remote controller is shown on the screen of the remote controller of the invention, the icons of the rest of the appliances are shown in a toolbar form 135 on the screen (FIG. 7), preferably in one of its margins. In this way, the user can switch any time he wishes to control another appliance, by pressing its icon, and displaying its keyboard on the screen. Of course, in some cases the user has to first acquire the remaining sections 42, 43, 44, 45, and 46, from the appliance, in the manner as described above, and then he can control the appliance. Key 150 of the remote controller is the ON/OFF key, and the other keys 151–155 are general functional and set-up keys for operating the remote controller of the invention, that are not included in the appliance specific remote controller 136 keys that are displayed on the screen. For example, key 153 may be used in order to move from one item to another in a menu that is displayed on the screen.

The remote controller of the invention can also be easily provided with an additional status (or state) interrogating command, that can be sent to a specific appliance, the keyboard of which is displayed on the remote controller screen, in order to acquire in one command the appliance current status. This can be done by the remote controller using the application section 45, that enables the user to interact with the appliance for carrying out special features, beyond the conventional features. In such a case, the appliance responds by sending to the remote controller a status register or the required information. By utilizing the set-up file of the appliance (in the database of the remote controller), if necessary, the said register or the information acquired may be easily translated in order to show the current status of the appliance. As said, if necessary, the set-up file is provided with a code for translating a received status register or information into a status display, informing the user the status of the appliance. The status register or information may be used by the user in order to find, for example, whether a video tape recorder is recording or playing, whether a kettle has finished boiling water or not, whether the lights in a remote room are ON, etc. There are many advantages to said option of a status display, which can be easily included within the adaptive remote controller of the invention, with no additional cost. Alternatively, the application file 45, when run in the remote controller, may enable the user to acquire any partial information and not a full status of the state of the appliance when such is necessary.

When contact between the appliance and the remote controller is made, the appliance might be in a functional state (current status) which is represented on the remote controller by a graphic setup which corresponds to the wake up state, e.g. specific window, specific icons, specific graphics. This state must be sent to the remote controller after contact is made. In such embodiments, the remote controller is context sensitive, and its current operation depends on one or more past states. This is significantly different from a classic remote controller, for which operation is either not context sensitive, or quite limited. Examples where the context sensitivity feature of the remote control of the current invention is useful include the synchronized control of several appliances or scenarios of controls such as the sequential operation of a television and video in order to program the recording of TV program on a video cassette.

In certain embodiments, the remote controller is provided with safety features for the benefit of the remote controller user. For example certain predefined appliances that produce an alarm signal (e.g. system malfunction) may be handled by special scripts, like turning off a stove (or any other machine that may endanger the environment) or turning on a security system.

Preferably, the remote controller may even be provided with means for alert signals initiated by the appliances, and for alerting (such as "beep-beep-beep") upon receipt of such signals. Said option may be used, for example, by a kettle to indicate that it has finished boiling the water. The alert signals may be accompanied by a corresponding message displayed on the screen.

In certain embodiments, the remote controller is provided with security features such as user authentication (by means of e.g., digital signature, finger-print recognition, voice recognition, face image recognition, password entered etc.). This may be required in appliances where the identity of the user is important (for example opening the car garage door, drawing money from ATM machines, automatic payment in toll roads, e-commerce etc.). Preferably, identification of a user is accomplished using an electronic signature-encrypted file created by a user and unidirectional. A user, when wishing to gain access, enters a secret number to generate an electronic signature-encrypted file which is compared to one or more files of one or more authorized users. In other embodiments, a hardware device such as a fingerprint recognition chip triggers the electronic signature comparison. In certain embodiments, if an unauthorized a user removes the batteries of the adaptive remote controller in an attempt to reset the original electronic signature, all the access grants dependent on such recognition are also erased, disallowing access and clearing the device.

The remote controller of the invention, the system associated with it, and/or the method for their operation can be used either indoors or outdoors. For example, the remote controller may be used for opening a garage door. In this case, when a driver approaches a garage door, an interrogation signal is sent from the remote controller to the garage door, which in turn responds by sending its identification signal and its set-up file. In this case, upon receipt of the set up file, a beep is heard at the remote controller, and the remote controller display is changed so as to display a button that when pushed, initiates a signal to open the door. According to another variation of the invention, the door itself sends repeated signals, and does not wait for receiving an interrogating signal from the remote controller. Of course, in this specific case the user identification at the remote controller and a signal encryption should be added as explained above with reference to security features.

According to still another embodiment of the invention, the remote controller has a "standby" state. In the "standby" state the application at the remote controller is turned OFF as well as the screen, in order to save battery energy. However, the remote controller still receives signals from the appliances. In the event that an appliance needs a special attention, such as when the water is boiling in the kettle, this message, when received by the remote controller, turns it ON, and the relevant message is displayed on the screen, associated by a warning signal ("beep-beep-beep"). For that purpose, some appliance messages are defined as "important messages", that can activate the remote controller even when it is in a standby state.

According to another embodiment of the invention, although less preferable, the remote controller may comprise conventional buttons, and a non-touch- sensitive display, instead of a full-screen display. In that case, the remote controller is provided with a small display showing in text format, and/or icons, and/or graphic patterns the interrogated (and detected) appliances, in a similar manner as before. Remaining set-up files of any detected one or more appliances may be acquired from the appliances and stored in the database of the remote controller, upon pushing a corresponding button for that appliance icon or text. More particularly, instead of touching the display for selecting the appliance or function, a physical key located near the icon or text can be pressed for selecting this part of the display. Then, after storing one or more set-up files in the database of the remote controller, the keyboard of the remote controller may be associated with one of said set-up files. The drawback of this embodiment of the invention is that the user has to learn the location and function of each key on the keyboard, if the association between the keyboard and set-up file does not provide a standard key location. A special key may be provided in the remote controller for switching between appliances, by associating the keys with another file set-up file in the database.

A key condition for the operation of the remote controller of the invention and the system associated with it, is the inclusion of a set-up file in any remote controlled appliance. Furthermore, all the appliances in the system and the remote controller itself must be provided with a wireless communication protocol compatible to all. However, this should not be a burden as it is already a tendency in the home appliances market to provide such a wireless communication protocol and operating system to appliances in order to allow communication between them. The advantages of the remote controller of the invention, when introduced to manufacturers, may even accelerate this tendency, and shorten the transitional period until most appliances be compatible with the system of the invention.

As said, the remote controller of the invention and its associated system are intended to communicate by an RF non-directional communication, not compatible with the existing remote controllers and appliances. Of course, this will not enable the remote controller of the invention to control existing appliances. This problem can be overcome in the transitional period, by providing the adaptive remote controller of the invention with means for downloading into its database, set up files of "old" appliances, e.g., from the Internet or any other database, a smart card, etc., and with infra-red transmitter. This way, applications and HELP scenarios can be added to control "type" of appliances, having only infrared receiving means, although naturally the feedback option, enabling bi-directional communications with the appliance, will not be possible. Alternatively, the remote controller may be provided with a ROM containing set-up files for most common appliance models. As said, the remote controller should therefore also be provided with an infrared source, in addition to its RF transmitter/receiver.

The communication protocol between the appliances and the remote controller, according to a preferred embodiment of the invention, is encrypted, and contains identification of each local system (e.g., all appliances in one apartment belong to a same local network), and of each appliance in each local system. In such a manner of operation, the possibility of an unauthorized control or intruding is eliminated.

According to one embodiment of the invention the application that runs on the remote controller includes, for example, the following portions:

a. A portion that handles the communication protocol and the communication with the appliances;

b. A portion that handles the receipt of a set up file, and storing it in the internal database;

c. A man-machine interface (MMI), preferably graphic, capable of displaying icons and/or text as described above;

d. A portion for running applications that are received, for example, from the appliances;

e. A portion for running an interactive HELP file that is specific for each appliance, as received from the appliance;

f. A portion for associating each interactive button on the screen with a signal to be sent to the appliance; and g. A voice card, if the remote controller is intended to be used by a blind person;

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

What is claimed is:

1. A method for remote controlling of appliances by a remote controller comprising:

I. In each appliance:
  a. providing a receiver for receiving signals from the remote controller;
  b. providing a transmitter for transmitting signals to the remote controller;
  c. providing a memory containing a set-up file, said set-up file including a functional section containing information for a remote controller regarding the various signal formats that should be sent by the remote controller in order to activate corresponding various features of the appliance and information for assigning each of said features to a button of the remote controller, and optionally an identification section containing data regarding the model identification of the appliance;
  d. providing decoding means for decoding signals sent by the remote controller, and accordingly either: (a) activating a feature of the appliance; or (b) transmitting at least a portion of said set-up file to the remote controller;

II. In the remote controller:
  a. providing a plurality of buttons;
  b. providing a receiver for receiving signals sent from at least one appliance;
  c. providing a transmitter for transmitting signals to at least one appliance, each of said signals is either: (a) a signal for activating a feature of the appliance; or (b) a signal instructing the appliance to transmit at least a portion of its set-up file;
  d. providing a memory storage for storing at least a portion of at least one set-up file;
  e. periodically interrogating an existence of all appliances in a vicinity of the remote controller;
  f. when the signal received from an appliance is a set-up file or a portion thereof, storing the same in said memory storage of the remote controller;
  g. providing means in the remote controller for selecting a set-up file or a portion thereof to be an active one; and
  h. using the content of said active set-up file for associating each feature of the corresponding appliance with a button in the remote controller for activating that feature.

2. A method according to claim 1, wherein the appliances are home appliances.

3. A method according to claim 1, wherein the appliances are outdoor appliances.

4. A method according to claim 1, wherein the range of communication between each appliance and the remote controller is generally up to about 100 meters.

5. A method according to claim 1, wherein the communication between the appliances and the remote controller and vice versa is multidirectional.

6. A method according to claim 1, wherein the communication between the appliances and the remote controller is carried out in the RF range.

7. A method according to claim 1, wherein the remote controller further comprises a display screen.

8. A method according to claim 7, wherein the display screen is a touch-sensitive display screen on which virtual buttons are displayed, and said buttons are activated by means of pressing their location on the screen.

9. A method according to claim 8, wherein said screen of the remote controller displays the virtual buttons for operating the appliances for which set-up files are active.

10. A method according to claim 7, wherein each appliance transmits the identification portion of its set-up file periodically, and the functional portion of its set-up file upon receipt of an acquiring command from a remote controller.

11. A method according to claim 10, wherein the remote controller displays on its screen an identification symbol for any appliance for which it contains in its memory storage an identification portion of the appliance set-up file.

12. A method according to claim 11 wherein said identification symbol is an icon representing a corresponding appliance.

13. A method according to claim 11, wherein said identification symbol is a text representing a corresponding appliance.

14. A method according to claim 10 wherein the remote controller marks on its screen as "existing and available" any identification symbol of an appliance for which it contains in its memory storage a functional portion of the appliance set-up file.

15. A method according to claim 14, wherein said acquiring command for acquiring a functional portion of an appliance set-up file is transmitted to said specific appliance upon pressing said appliance symbol on the screen of the remote controller.

16. A method according to claim 1 wherein each set-up file of the appliance further comprises a status portion, indicating the current status of the appliance.

17. A method according to claim 1, wherein each identification section of the set-up file of the appliance further comprises data regarding the graphic image of the remote controller of the appliance, and of each of its buttons.

18. A method according to claim 1 wherein the identification portion of a set-up file is sent periodically by the appliance to the remote controller.

19. A method according to claim 1, wherein said set up file further includes a HELP section, for providing the user of the remote controller with help regarding on how to control and operate the appliance.

20. A remote controller for controlling at least one appliance in an environment, characterized in that it periodically interrogates an existence of all appliances in the environment, acquires from each appliance in said environment a set-up file containing a functional portion of at least information regarding the various signal formats that should be sent by the remote controller for activating various features of the appliance and information for assigning each of said features to a button of the remote controller, and optionally an identification information regarding the identification of said appliance.

21. A remote controller according to claim 20, comprising:
  a. a plurality of buttons;
  b. a receiver for receiving signals from at least one appliance;
  c. a transmitter for transmitting signals to at least one appliance, each of said signals is either: (a) a signal for activating a feature of the appliance; or (b) an acquiring command instructing the appliance to transmit at least a portion of a set-up file thereof;
  d. a memory storage for storing at least one set-up file that is received from an appliance;
  e. means for selecting a set-up file to be defined as an active one; and
  f. means for associating each feature of the appliance with a button of the remote controller for activating that feature.

22. A remote controller according to claim 21, further provided with means for displaying on the display screen representing identifications of all appliances of which an identification portion is received by the remote controller.

23. A remote controller according to claim 22, further comprising means for deleting from the memory storage of the remote controller a setup file of an appliance if the identification portion of said set-up file is not received during a predetermined time period.

24. A remote controller according to claim 22, further comprising means for deleting from the memory storage of the remote controller the identification portion of a setup file of an appliance if said identification portion is not received during a predetermined time period.

25. A remote controller according to claim 22, further comprising means for sending an acquiring command to a specific appliance, for acquiring from the appliance the functional portion of its set-up file, and for storing said functional portion in the remote controller memory.

26. A remote controller according to claim 25 further comprising means for marking an identification symbol of all appliances in the environment for which their functional portion of their set-up file is stored in the memory storage of the remote controller as "existing and available", the remaining identification symbols of the rest of the appliances, for which a functional portion has not been acquired by the remote controller remain marked as "existing but not available".

27. A remote controller according to claim 21, further comprising means for acquiring a status section of a set-up file from the appliance.

28. A remote controller according to claim 27, wherein said means for acquiring said status section of a set-up file includes a status acquiring command that is sent from the remote controller to the appliance, asking appliance to transmit said status portion.

29. A remote controller according to claim 28, further comprising means for displaying on the display a current status of the appliance who sent said status portion.

30. A remote controller according to claim 21 further comprising means for determining from a received status section of a set-up file of an appliance the current status of the appliance.

31. A remote controller according to claim 30, further comprising indicating and alerting means, for informing the user of the remote controller according to the determining of a received status portion.

32. A remote controller according to claim 20, further comprising safety feature means.

33. A remote controller according to claim 20, further comprising security feature means.

34. A remote controller according to claim 33, wherein said security feature means includes user authentication means.

35. A system for remote controlling of appliances in an environment, said environment including at least one appliance and at least one remote controller, each appliance in said environment has its specific features and its predefined signals for remotely activating said features, the system comprising:
  I. at least one appliance, comprising:
    a. a set up file containing a functional portion of information on how to remotely activate features of said appliance, and optionally an identification portion identifying the appliance;
    b. a receiver for receiving commands from a remote controller;
    c. a transmitter for transmitting information from the appliance to the remote controller; and
    d. a logic circuit for decoding commands from a remote controller and:
      d.1 when a command is found as an activating command, activating a corresponding feature of the appliance; and
      d.2 when a command is decoded as an acquiring command, transmitting at least a portion of said set-up file to the remote controller who sent the acquiring command;

II. at least one remote controller for controlling said at least one appliance in the environment, characterized in that it periodically interrogates an existence of all appliances in the environment, acquires from each appliance in said environment said set-up file containing a functional portion of at least information regarding the various signal formats that should be sent by said remote controller for activating various features of said appliance and information for assigning each of said features to a button of said remote controller, and optionally an identification information regarding the identification of said appliance; and III. a wireless communication protocol in each appliance and remote controller for managing communication in the environment between the at least one remote controller and the at least one appliance in said environment.

36. A system according to claim 35, wherein the communication protocol between each appliance and the remote controller and vice versa is a wireless communication protocol for appliances.

37. A system according to claim 35, wherein the communication protocol between each appliance and the remote controller and vice versa, is selected from the group consisting of "Home-RF (HomePNA)", "Wireless LAN", and "Bluetooth".

38. A remote controller for controlling at least one appliance in an environment, characterized in that it acquires from each appliance in said environment a set-up file containing a functional portion of at least information regarding the various signal formats that should be sent by the remote controller for activating various features of the appliance and information for assigning each of said features to a button of the remote controller, and optionally an identification information regarding the identification of said appliance; the remote controller further comprising:
  a. a plurality of buttons;
  b. a receiver for receiving signals from at least one appliance;
  c. a transmitter for transmitting signals to at least one appliance, each of said signals is either: (a) a signal for activating a feature of the appliance; or (b) an acquiring command instructing the appliance to transmit at least a portion of a set-up file thereof;
  d. a memory storage for storing at least one set-up file that is received from an appliance;
  e. means for selecting a set-up file to be defined as an active one; and
  f. means for associating each feature of the appliance with a button of the remote controller for activating that feature;
wherein the remote controller is further provided with means for displaying on the display screen representing identifications of all appliances of which an identification portion is received by the remote controller, and wherein the remote controller further comprises means for deleting from the memory storage of the remote controller a setup file of an appliance if the identification portion of said set-up file is not received during a predetermined time period.

39. A remote controller for controlling at least one appliance in an environment, characterized in that it acquires from each appliance in said environment a set-up file containing a functional portion of at least information regarding the various signal formats that should be sent by the remote controller for activating various features of the appliance and information for assigning each of said features to a button of the remote controller, and optionally an identification information regarding the identification of said appliance; the remote controller further comprising:
  a. a plurality of buttons;
  b. a receiver for receiving signals from at least one appliance;
  c. a transmitter for transmitting signals to at least one appliance, each of said signals is either: (a) a signal for activating a feature of the appliance; or (b) an acquiring command instructing the appliance to transmit at least a portion of a set-up file thereof;
  d. a memory storage for storing at least one set-up file that is received from an appliance;
  e. means for selecting a set-up file to be defined as an active one; and
  f. means for associating each feature of the appliance with a button of the remote controller for activating that feature;
wherein the remote controller is further provided with means for displaying on the display screen representing identifications of all appliances of which an identification portion is received by the remote controller, and wherein the remote controller further comprises means for deleting from the memory storage of the remote controller the identification portion of a setup file of an appliance if said identification portion is not received during a predetermined time period.

40. A method for remote controlling of appliances by a remote controller comprising:
  I. In each appliance:
    a. providing a receiver for receiving signals from the remote controller;
    b. providing a transmitter for transmitting signals to the remote controller;
    c. providing a memory containing a set-up file, said set-up file including a functional section containing information for a remote controller regarding the various signal formats that should be sent by the remote controller in order to activate corresponding various features of the appliance and information for assigning each of said features to a button of the remote controller, and optionally an identification section containing data regarding the model identification of the appliance, said set-up file further including a HELP section for providing the user of the remote controller with help regarding on how to control and operate the appliance;
    d. providing decoding means for decoding signals sent by the remote controller, and accordingly either: (a) activating a feature of the appliance; or (b) transmitting at least a portion of said set-up file to the remote controller;
  II. In the remote controller:
    a. providing a plurality of buttons;
    b. providing a receiver for receiving signals sent from at least one appliance;
    c. providing a transmitter for transmitting signals to at least one appliance, each of said signals is either: (a) a signal for activating a feature of the appliance; or (b) a signal instructing the appliance to transmit at least a portion of its set-up file;
    d. providing a memory storage for storing at least a portion of at least one set-up file;
    e. when the signal received from an appliance is a set-up file or a portion thereof, storing the same in said memory storage of the remote controller;

f. providing means in the remote controller for selecting a set-up file or a portion thereof to be an active one; and g. using the content of said active set-up file for associating each feature of the corresponding appliance with a button in the remote controller for activating that feature.

41. A remote controller for controlling at least one appliance in an environment, characterized in that it acquires from each appliance in said environment a set-up file containing a functional portion of at least information regarding the various signal formats that should be sent by the remote controller for activating various features of the appliance and information for assigning each of said features to a button of the remote controller, and optionally an identification information regarding the identification of said appliance; the remote controller further comprising:

a. a plurality of buttons;

b. a receiver for receiving signals from at least one appliance;

c. a transmitter for transmitting signals to at least one appliance, each of said signals is either: (a) a signal for activating a feature of the appliance; or (b) an acquiring command instructing the appliance to transmit at least a portion of a set-up file thereof;

d. a memory storage for storing at least one set-up file that is received from an appliance;

e. means for selecting a set-up file to be defined as an active one; and f. means for associating each feature of the appliance with a button of the remote controller for activating that feature;

wherein the remote controller is further provided with means for displaying on the display screen representing identifications of all appliances of which an identification portion is received by the remote controller, wherein the remote controller further comprises means for sending an acquiring command to a specific appliance, for acquiring from the appliance the functional portion of its set-up file, and for storing said functional portion in the remote controller memory, and wherein the remote controller further comprises means for marking an identification symbol of all appliances in the environment for which their functional portion of their set-up file is stored in the memory storage of the remote controller as "existing and available", the remaining identification symbols of the rest of the appliances, for which a functional portion has not been acquired by the remote controller remain marked as "existing but not available".

42. A remote controller for controlling at least one appliance in an environment, characterized in that it acquires from each appliance in said environment a set-up file containing a functional portion of at least information regarding the various signal formats that should be sent by the remote controller for activating various features of the appliance and information for assigning each of said features to a button of the remote controller, and optionally an identification information regarding the identification of said appliance, and wherein the remote controller further comprises safety feature means.

43. A remote controller for controlling at least one appliance in an environment, characterized in that it acquires from each appliance in said environment a set-up file containing a functional portion of at least information regarding the various signal formats that should be sent by the remote controller for activating various features of the appliance and information for assigning each of said features to a button of the remote controller, and optionally an identification information regarding the identification of said appliance, and wherein the remote controller further comprises security feature means.

44. A remote controller according to claim 43, wherein said security feature means includes user authentication means.

* * * * *